United States Patent [19]

Brooks

[11] Patent Number: 5,678,003
[45] Date of Patent: Oct. 14, 1997

[54] METHOD AND SYSTEM FOR PROVIDING A RESTARTABLE STOP IN A MULTIPROCESSOR SYSTEM

[75] Inventor: Jeffrey S. Brooks, Round Rock, Tex.

[73] Assignee: International Business Machines Corporation, Armonk, N.Y.

[21] Appl. No.: 546,368

[22] Filed: Oct. 20, 1995

[51] Int. Cl.$^6$ .................................................... G06F 11/00
[52] U.S. Cl. .................... 395/183.1; 395/726; 364/230.2; 364/263.2
[58] Field of Search ........................... 395/183.1, 183.06, 395/183.11, 610, 726; 364/230.2, 242, 263.2

[56] References Cited

U.S. PATENT DOCUMENTS

| | | | |
|---|---|---|---|
| 3,905,023 | 9/1975 | Perpiglia | 340/172.5 |
| 4,308,581 | 12/1981 | Raghunathan | 364/200 |
| 4,456,951 | 6/1984 | Hennberger | 395/183.1 X |
| 4,502,116 | 2/1985 | Fowler | 364/200 |
| 4,679,195 | 7/1987 | Dewey | 395/183.1 X |
| 4,819,234 | 4/1989 | Huber | 371/19 |
| 4,852,092 | 7/1989 | Makita | 371/12 |
| 4,866,665 | 9/1989 | Haswell-Smith | 364/900 |
| 4,879,646 | 11/1989 | Iwasaka et al. | 364/200 |
| 4,982,402 | 1/1991 | Beaven et al. | 371/12 |
| 5,020,059 | 5/1991 | Gorin et al. | 371/11.3 |
| 5,021,950 | 6/1991 | Nishikawa | 364/200 |
| 5,297,276 | 3/1994 | Millar | 395/550 |
| 5,317,749 | 5/1994 | Dahlen | 395/725 |
| 5,317,752 | 5/1994 | Jewett et al. | 395/750 |
| 5,355,471 | 10/1994 | Weight | 395/575 |
| 5,367,550 | 11/1994 | Ishida | 377/39 |
| 5,367,665 | 11/1994 | Koch et al. | 395/575 |
| 5,488,728 | 1/1996 | Dreyer | 395/726 |
| 5,561,761 | 10/1996 | Hicok | 395/183.06 |

FOREIGN PATENT DOCUMENTS

| | | | |
|---|---|---|---|
| 1318543 | 12/1989 | Japan | H02M 3/00 |
| 0589054 | 4/1993 | Japan | G06F 15/16 |

Primary Examiner—Robert W. Beausoliel, Jr.
Assistant Examiner—Dieu-Minh Le
Attorney, Agent, or Firm—Benman Collins & Sawyer; Michael A. Davis, Jr.

[57] ABSTRACT

A multiprocessor system provides for a restartable stop condition that is fast and easily implemented. The multiprocessor system includes a plurality of processors. Each of the processors includes a bidirectional stop pin, which normally when asserted indicates that an error has been detected. Each of the plurality of processors also includes a scan port. The plurality of processors in the multiprocessor system are coupled together via their respective stop pins. By switching the stop pins to a different mode whereby an assertion of the pin causes the receiving processor to enter a restartable stop condition as a result of a restartable stop condition being achieved by the driving processor, the multiprocessor system can be quickly stopped. The restartable system stop technique when implemented utilizing a plurality of processors in which each of the processors include this stop pin provides both a straightforward and fast method for stopping a multiprocessor system in a restartable manner following the occurrence of any particular event. This commonly includes an instruction address breakpoint, single instruction step, data address breakpoint, or specific JTAG instruction. Memory coherency in the multiprocessor system is maintained throughout, such that functional clocks may be stopped, the machine state observed and restored in a non-destructive manner via scan, and functional clocks and code execution can then be restarted.

16 Claims, 4 Drawing Sheets

METHOD AND SYSTEM FOR PROVIDING A RESTARTABLE STOP IN A MULTIPROCESSOR SYSTEM

FIELD OF THE INVENTION

The present invention relates to a multiprocessor system and more particularly to a method and system for providing a restartable stop as a result of a particular event in such a multiprocessor system.

BACKGROUND OF THE INVENTION

A valuable debug feature often found in a uniprocessor system is the ability to stop the system as a result of an instruction address breakpoint, observe the machine state in a non-destructive manner via scan, and then restart the code execution from the instruction address breakpoint, i.e., a restartable stop condition. Accordingly, a restartable system stop is defined in this application as one in which a particular event (commonly instruction or data address breakpoint, single instruction step, or specific JTAG instruction) results in code execution being stopped, and if desired, functional clocks being stopped, while coherent memory space is maintained. If functional clocks are stopped, the machine state may then be observed in a non-destructive manner via scan, and functional clocks and code execution may then be restarted. Providing this same debug feature in a multiprocessor system is a significant challenge.

For this feature to be effectively utilized in a multiprocessor system, coherent memory space must continue to be maintained from the time code execution stops on the microprocessor detecting the instruction address breakpoint, until all microprocessors have stopped code execution (and therefore stopped initiating bus activity), and the system bus arbiter has terminated or paused all system bus activity normally required to be snooped, such as direct memory access (DMA).

In addition, it is a key requirement that when a given microprocessor reaches an instruction address breakpoint, the other microprocessors quickly stop code execution, such that their state resemble as close as possible the state present when the instruction address breakpoint was reached.

By way of example, the PowerPC 601 Microprocessor provides an adequate uniprocessor solution for a restartable system stop, but was not designed as a multiprocessor solution. While the 601 microprocessor can be used to implement a multiprocessor solution, the result is slow and not effective for many multiprocessor applications.

Although each of the processors works effectively alone, when the processors are utilized in a multiprocessor system the multiprocessor system has two major shortcomings.

Firstly, the multiprocessor system requires significant complexity. In this conventional system, two specific I/O pins, quiesce request (QUIESC_REQ) and system quiesced (SYS_QUIESC_) are required on each processor to accomplish the restartable system stop. This in turn places additional board trace and pin requirements on the multiprocessor system.

Secondly, code execution does not stop quickly enough on all processors after a given processor reaches a restartable stop condition. This is because the processor has no quiesce request input pin, so it cannot quickly respond to the quiesce request of another processor in a multiprocessor system. In the multiprocessor system a scan interface tool (connected to the industry standard scan port known as the IEEE 1149.1 test access port, or JTAG port of each microprocessor) is utilized to detect the quiesce request of one processor, and then issue a JTAG instruction to the other processors, requesting that they also stop code execution. By the time all processors have received and acted on the JTAG instruction, they may have executed hundreds or thousands of instructions since the restartable stop condition was first reached.

Accordingly, a hardware and software debug technique in a multiprocessor system utilizing known microprocessors poses a significant challenge. No straightforward method exists for quickly stopping the system in a restartable manner after a given microprocessor reaches a restartable stop condition (commonly an instruction address breakpoint, single instruction step, specific JTAG instruction, or data address breakpoint).

What is required, therefore, is a method and system utilized in a multiprocessor environment which is simple and easily implemented on existing multiprocessor architectures. Such a system should be one that can stop quickly following the occurrence of any particular event (such as an instruction address breakpoint) and ensure memory coherency is maintained between the different processors as well as accuracy of the information. The present invention addresses such a need.

SUMMARY OF THE INVENTION

A multiprocessor system in accordance with the present invention is disclosed that addresses the above-mentioned problems. A multiprocessor system provides for a restartable stop condition that is fast and easily implemented. The multiprocessor system includes a plurality of processors. Each of the processors includes a bidirectional stop pin, which normally when asserted indicates that an error has been detected. Each of the plurality of processors also includes a scan port. The plurality of processors in the multiprocessor system are coupled together via their respective stop pins. By switching the stop pins to a different mode whereby an assertion of the pin causes the receiving processor to enter a restartable stop condition as a result of a restartable stop condition being achieved by the driving processor, the multiprocessor system can be quickly stopped.

The restartable system stop technique when implemented utilizing a plurality of processors in which each of the processors include this stop pin provides both a straightforward and fast method for stopping a multiprocessor system in a restartable manner following the occurrence of any particular event. This commonly includes an instruction address breakpoint, single instruction step, data address breakpoint, or specific JTAG instruction.

Memory coherency in the multiprocessor system is maintained throughout, such that functional clocks may be stopped, the machine state observed and restored in a non-destructive manner via scan, and functional clocks and code execution can then be restarted.

The above described system and method improves the debug capabilities of the microprocessors and system, and decreases the time required for hardware and software debug. A private JTAG instruction can be used to select between two modes on an existing bidirectional pin. In a preferred embodiment, the two modes are functional mode and debug mode. Thus, no additional I/O pins are required on the microprocessor package, and no additional board traces or pins are required at the system level.

DETAILED DESCRIPTION

The present invention relates to an improvement in a multiprocessor system. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
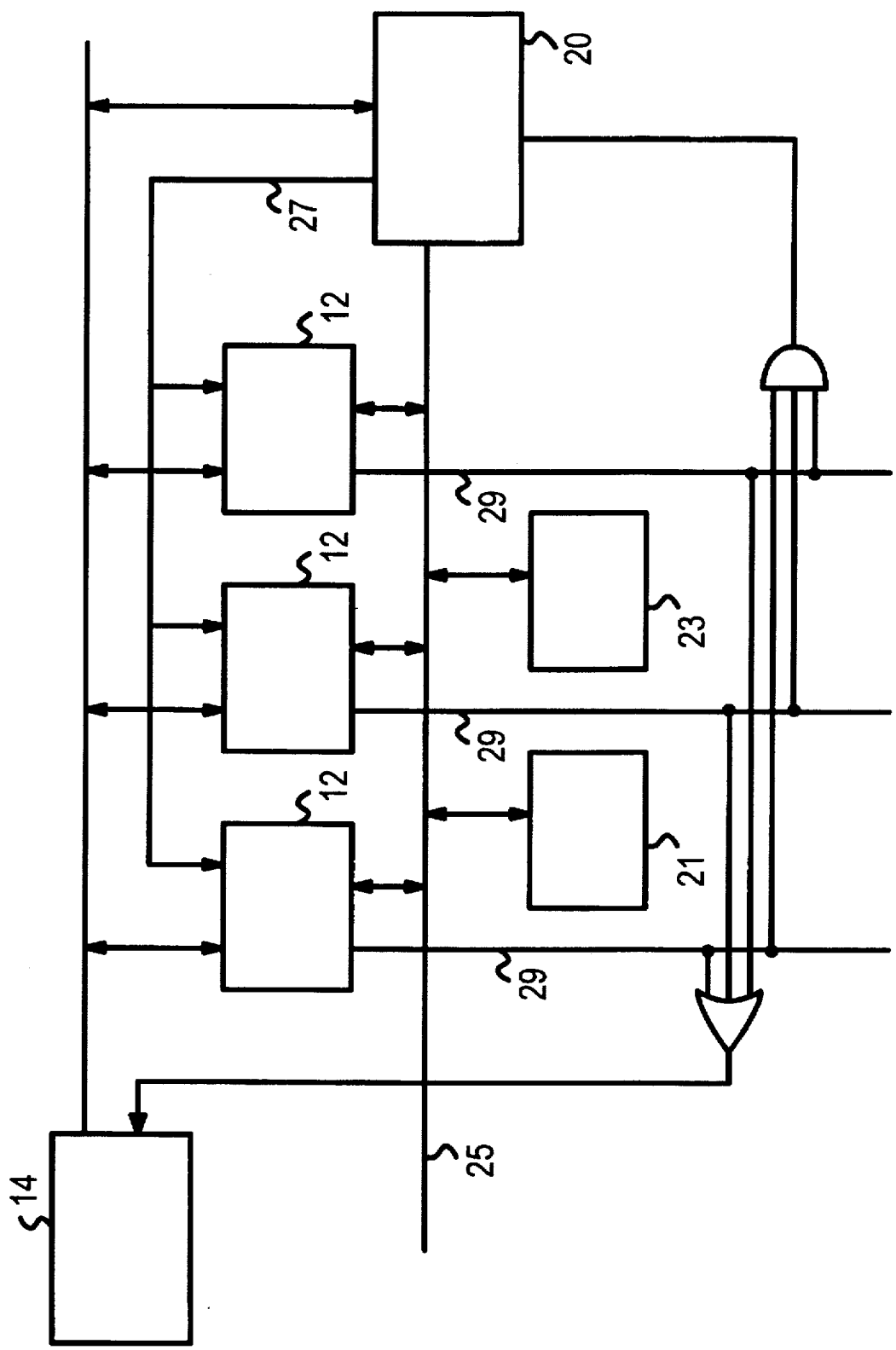
FIG. 1 is a block diagram of a prior art multiprocessing system.

FIG. 1 is a block diagram of a prior art multiprocessing system 10. The system 10 includes a plurality of processors which are coupled together to provide scan access. The processors 12 are typically under scan by a scan interface tool 14 via a common port typically known as a JTAG port. The system 10 includes a system bus arbiter 20, an input/output (I/O) subsystem 21, and a memory subsystem 23. The I/O subsystem 21 and memory subsystem 23 communicate with the processors 12 via a processor bus 25. The system bus arbiter 20 controls access to the shared processor bus 25.

In such a processor 12, prior to stopping functional clocks due to a restartable stop condition (commonly an instruction address breakpoint, data address breakpoint, single instruction step, or specific JTAG instruction) the processor 12 signals quiesce request (QUIESC_REQ) 29 to the system and scan interface tool 14, and waits for a system quiesced (SYS_QUIESC_) signal 27 back from the system bus arbiter 20 as an indication that functional clocks can be stopped to allow the machine state to be scanned. When the scan interface tool 14 detects the quiesce request of one of the processors 12, it then issues a JTAG instruction to the other processors 12, requesting that they also stop code execution and assert their QUIESC_REQ signal 29. In response to the QUIESC_REQ signal 29 from each of the processors 12, the system bus arbiter 20 first terminates or pauses all system bus activity normally required to be snooped by the processors 12, such as direct memory access (DMA) from the I/O subsystem 21, then signals SYS_QUIESC_ 27, enabling each of the processors 12 to stop functional clocks for scan. Thus, memory coherency is maintained, and the system is restartable.

Although each of the processors 12 works effectively alone, when the processors 12 are utilized in a multiprocessor system 10 the multiprocessor system 10 has two major shortcomings.

(1) The multiprocessor system 10 requires significant complexity. In this conventional system 10, two specific I/O pins (QUIESC_REQ_ 29 and SYS_QUIESC_ 27) are required on each processor 12, which in turn places additional board trace and pin requirements on the multiprocessor system 10.

(2) Code execution does not stop quickly enough on all processors 12 after a given processor 12 reaches a restartable stop condition. This is because the processor 12 has no quiesce request input pin, so it cannot quickly respond to the quiesce request of another processor 12 in a multiprocessor system 10. In the multiprocessor system 10 a scan interface tool 14 is utilized to detect the quiesce request of one processor 12, and then issues a JTAG instruction to the other processors 12, requesting that they also stop code execution. By the time all processors 12 have received and acted on the JTAG instruction, they may have executed hundreds or thousands of instructions since the restartable stop condition was first reached.

The present invention takes advantage of the fact that there is typically a common I/O pin on a microprocessor which is utilized to indicate that the internal processor clocks should be stopped due to a nonmaskable stop or error condition (i.e., CheckStop_ signal). Through the present invention, this common pin is simply switched to a different mode when a private JTAG instruction, mp_ debug, is issued. By switching the pin in this manner, and also hardwiring this common pin between processors in the multiprocessor system, each processor in the multiprocessing system can stop code execution in a restartable manner much faster than previously known systems.

Three features of these processors are taken advantage of to provide a multiprocessor system that is a significant improvement over separate conventional multiprocessing systems.

(1) A private JTAG instruction, mp_ debug, which enables functional clocks to continue running when a restartable stop condition is reached, enabling snooping to continue even though the processor is not executing code. The mp_ debug instruction also places the CheckStop_ pin in debug mode.

(2) A JTAG accessed status bit (captured into the JTAG instruction register for scan access), stop_req, that indicates the following condition: (a) restartable stop condition has been reached (the processor has stopped fetching and dispatching instructions, and has completed all outstanding instructions), (b) the JTAG mp_ debug instruction has been previously issued, and (c) snooping is enabled.

(3) A bidirectional, open-drain I/O pin, CheckStop_, that enters a "debug mode" when the JTAG mp_ debug instruction is issued. The CheckStop_ pin remains in functional mode (default) if the mp_ debug instruction has not been issued.

The bidirectional CheckStop_ pin includes the following modes and functionality:

Functional Mode:
Default mode at power-up

| | | |
|---|---|---|
| Output | Asserted- | An unrecoverable error has been detected. Internal processor clocks will stop. |
| | Negated- | Indicates that the processor is operating normally. |
| Input | Asserted- | An unrecoverable error has been detected. Internal processor clocks should stop. |
| | Negated- | Indicates that normal operation should proceed. |

Debug Mode:
Entered via a private JTAG instruction "mp_debug"

| | | |
|---|---|---|
| Output | Asserted- | A restartable stop condition has been reached (the processor has stopped fetching and dispatching instructions, and has completed all outstanding instructions), no code is executing, snooping is enabled. Indicates the same condition as the JTAG accessed status bit "stop_req". |
| Input | Asserted- | The processor should enter a restartable stop condition (stop fetching and dispatching |

|           |                                              |
|-----------|----------------------------------------------|
|           | instructions, and complete all outstanding instructions). |
| Negated-  | Indicates that normal operation should proceed. |

Figure 2:
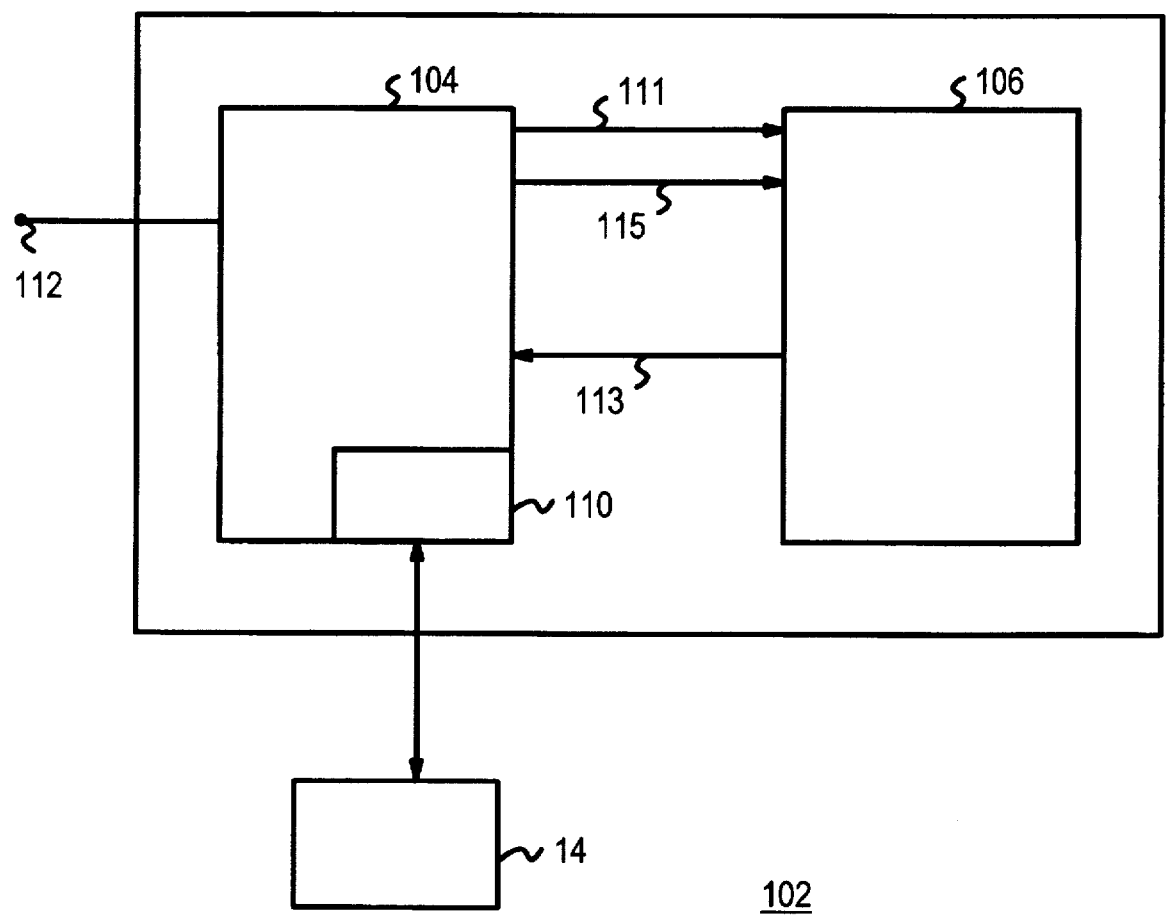
FIG. 2 is a block diagram of a single processor in such a processing system of FIG. 3.

To more particularly describe these features in the context of the present invention, refer now to FIG. 2, which shows a simple block diagram of a microprocessor 102 which can be utilized in a multiprocessor system in accordance with the present invention. The microprocessor 102 includes a test and debug interface unit (TIU) 104 which is coupled to an instruction flow unit (IFU) 106. The IFU 106 is responsible for instruction dispatch and completion. Within the TIU 104 is an industry standard scan port 110 which includes an instruction set used for test and debug functions.

The interface between the IFU 106 and TIU 104 includes a plurality of signals. The soft_stop_debug signal 111 informs the IFU 106 that the private JTAG instruction "soft_stop_debug" has been issued by the scan interface tool, and the processor is in debug mode. In the case of an instruction address breakpoint, the processor should not take an interrupt when the breakpoint is reached (as is the case in normal, non-debug mode), but should (a) stop fetching and dispatching instructions (b) complete all outstanding instructions (c) assert the idle signal 113 to the TIU 104 when (a) and (b) are accomplished.

In the case of single instruction dispatch mode, the processor should (a) complete one instruction (b) assert the idle signal 113 to the TIU 104 when (a) is accomplished.

The idle signal 113 informs the TIU 104 that the processor has stopped fetching and dispatching instructions and has completed all outstanding instructions. The halt signal 115 informs the IFU 106 that the private JTAG instruction "halt" has been issued by the scan interface tool, and the processor should (a) stop fetching and dispatching instructions, (b) complete all outstanding instructions, (c) assert the idle signal 113 to the TIU 104 when (a) and (b) are accomplished.

In a preferred embodiment the scan port 110 is referred to as a JTAG port 110. In a preferred embodiment the connections that form the JTAG port 110 include a scan-input, a scan-output, a mode select input, a test clock input and a test reset input. These are functions that are specific to a JTAG port 110. However, one of ordinary skill in the art recognizes that there could be a variety of other functions programmed into this section of the test and debug interface and those functions would be within the spirit and scope of the present invention.

Figure 3:
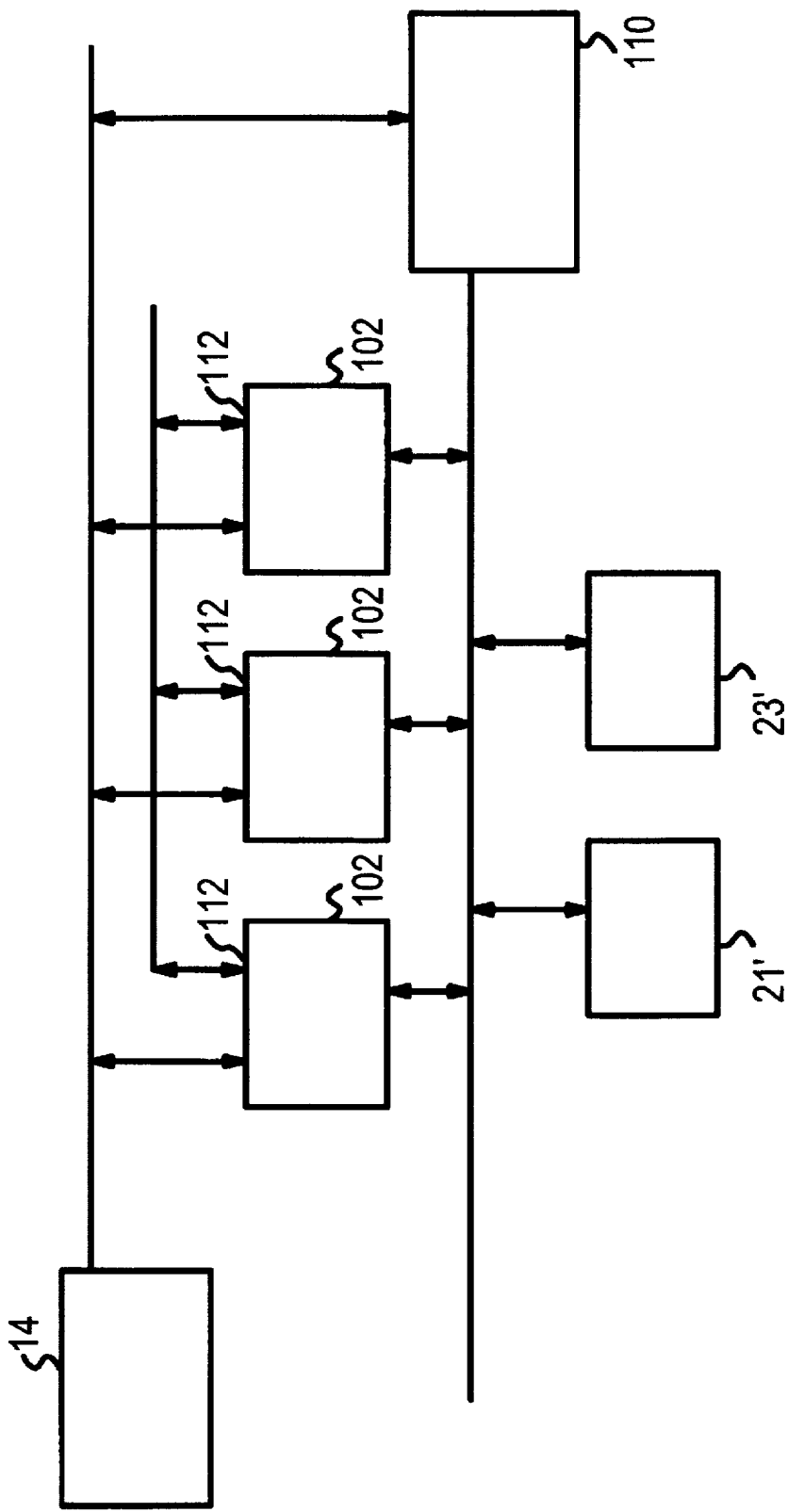
FIG. 3 is a block diagram of a multiprocessing system in accordance with the present invention.

The features of the microprocessor 102 can be utilized to advantage in a multiprocessing environment. To further illustrate the advantages of the microprocessor 102 in a multiprocessor system 100 in accordance with the present invention refer now to FIG. 3. As is seen, each of the microprocessors 102 have a common stop pin 112 (i.e., CheckStop_ pin) which changes state based on an active signal being provided by one of the microprocessors 102. Hence, since this common stop pin 112 is present on all of the microprocessors 102 and all the microprocessors 102 are hardwired together via their common stop pin 112, all of the microprocessors 102 will quickly enter a restartable stop state if the stop signal is asserted by one of the microprocessors 102 indicating that a restartable stop condition is initiated.

Figure 4:
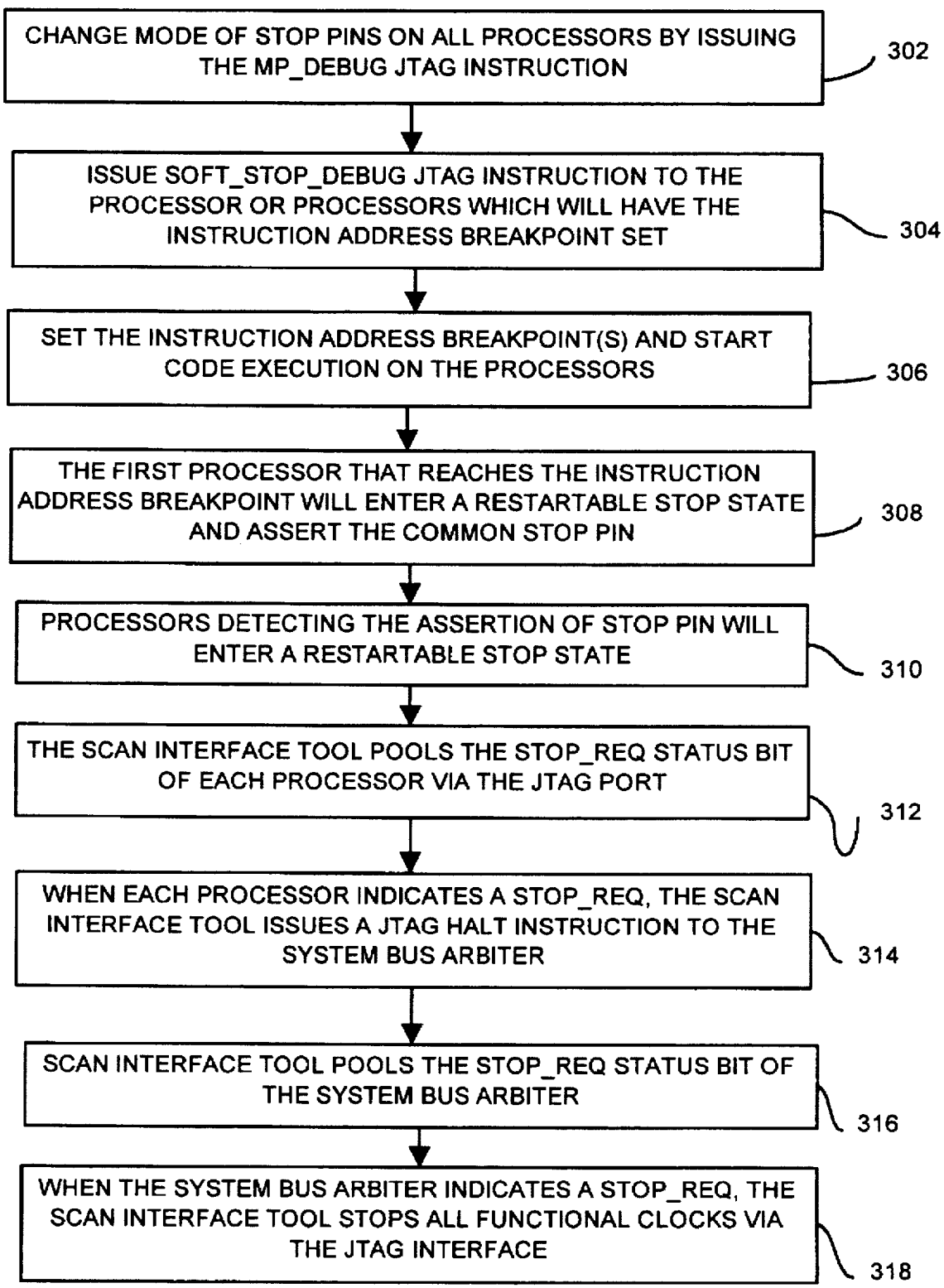
FIG. 4 is a flow chart showing the operation of a multiprocessor system when an instruction address breakpoint is to be set in a given processor or processors.

To more clearly describe the operation of the multiprocessor system 100, refer now to the following discussion in conjunction with FIG. 4 which is a flow chart showing the operation of the multiprocessor system 100 when an instruction address breakpoint is to be set in a given processor or processors. First, a JTAG mp_ debug instruction is issued to each microprocessor 102 in the microprocessor system 100, enabling each microprocessor 102 to assert the stop pin 112 at the appropriate time and continue snooping when a restartable stop condition (commonly instruction address breakpoint, data address breakpoint, single instruction step, or specific JTAG instruction) is reached via step 302.

Next a soft_stop_debug JTAG instruction will be issued to the processors or processor which will have the instruction address breakpoint set, via step 304. Next the appropriate instruction address breakpoint(s) are set and code execution is started on each processor 112, via step 306. Next, the first processor that reaches the instruction address breakpoint will enter a restartable stop state and assert the common stop pin 112 via step 308. Next, the remaining processors that detect the assertion of the stop pin 112 will enter a restartable stop state, via step 310. The scan interface tool 14 then polls the stop_ req status bit of each processor via the JTAG port, via step 312.

After each processor indicates a stop_ req, the scan interface tool 14 issues a JTAG halt instruction to the system bus arbiter 110, indicating that it should terminate or pause all bus activity normally required to be snooped, such as direct memory access (DMA) from the I/O subsystem 21, via step 314. Thereafter, the scan interface tool polls the stop_ req status bit of the system bus arbiter 110 via step 316. Finally when the system bus arbiter 110 indicates stop_ req the scan interface tool stops all functional clocks via the JTAG interface, via step 318. Accordingly, memory coherency of the multiprocessor system has been preserved, and the system is restartable.

The restartable system stop technique can provide both a straightforward and fast method for stopping a multiprocessor system in a restartable manner following an instruction address breakpoint, data address breakpoint, single instruction step, specific JTAG instruction, or the occurrence of any particular event.

The described technique provides a straightforward method for quickly stopping a multiprocessor system in a restartable manner, improving the debug capabilities of the microprocessor and system, and decreasing the time required for hardware and software debug. Because the CheckStop_ signal is a pre-existing signal whose definition simply changes due to a private JTAG instruction, no additional I/O pins are required on the microprocessor package, and no additional board traces or pins are required at the system level.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

I claim:

1. A multiprocessor system including a plurality of processors, the multiprocessor system having a restartable stop condition, the plurality of processors coupled together, each of the processors including a stop pin that signals the processor to stop functional clocks, each of the plurality of processors including a scan port, the multiprocessor system comprising:

means for coupling the stop pins of the plurality of processors together;

means for switching the stop pins to a different mode responsive to a particular command, and resulting in at least one processor asserting its stop pin when a restartable stop condition is reached;

means for providing a signal which stops all of the processors; and a scan interface tool for polling the status of the processors via the scan ports and issuing a JTAG instruction responsive to a state of JTAG accessible status bits which indicates the following conditions:
   (a) restartable stop condition has been reached;
   (b) the JTAG mp__ debug instruction has been previously issued; and
   (c) snooping is enabled.

2. The multiprocessor system of claim 1 in which the command comprises an mp__ debug instruction.

3. The multiprocessor system of claim 2 wherein the mp__ debug instruction enables the functional clocks to continue running when a restartable stop condition is reached, enabling snooping to continue even though the processor is not executing code.

4. The multiprocessor system of claim 1 wherein memory coherency is maintained in a multiprocessor system.

5. The multiprocessor system of claim 4 wherein the functional clocks can be stopped, the machine state of the multiprocessor system can be observed and restored in a non-destructive manner via scan and functional clocks and code execution can be restarted.

6. The multiprocessor system of claim 1 in which each of the scan ports comprises a JTAG scan port.

7. The multiprocessor system of claim 4 in which the assertion of the stop pin comprises a restartable stop condition.

8. The multiprocessor system of claim 1 in which the restartable stop condition comprises an instruction address breakpoint.

9. The multiprocessor system of claim 1 in which the restartable stop condition comprises a single instruction step.

10. The multiprocessor system of claim 1 in which the restartable stop condition comprises a particular JTAG instruction.

11. The multiprocessor system of claim 1 in which the restartable stop condition comprises a data addresses breakpoint.

12. The multiprocessor system of claim 1 in which the restartable condition comprises the occurrence of any particular event.

13. A method for providing a restartable stop to a multiprocessor system, the multiprocessor system including a plurality of processors, the plurality of processors coupled together, each of the processors including a stop pin that signals the processor to stop functional clocks, each of the plurality of processors including a scan port, the method comprising the steps of:

(a) coupling all of the stop pins of the processors together;

(b) changing the modes of the stop pins on all of the processors by issuing a particular command;

(c) at least one of the processors in the multiprocessor system asserting the stop pin, wherein the remaining processors will quickly enter the restartable stop condition;

(d) accessing a state of JTAG accessible status bits; and (e) polling the status of each processor and issuing a JTAG instruction responsive to the state of JTAG accessible status bits, in which a JTAG accessible status bit indicates the following conditions: a restartable stop condition has been reached; the JTAG mp__ debug instruction has been previously issued; and snooping is enabled.

14. The method of claim 13 in which the particular JTAG instruction comprises an mp__ debug instruction.

15. The method of claim 13 in which each of the scan ports comprises a JTAG scan port.

16. The method of claim 13 in which the assertion of the stop pin comprises a restartable stop condition.

* * * * *